US010993244B2

(12) United States Patent
Sari

(10) Patent No.: US 10,993,244 B2
(45) Date of Patent: Apr. 27, 2021

(54) ENHANCED NOMA SCHEME

(71) Applicant: Sequans Communications S.A., Colombes (FR)

(72) Inventor: Hikmet Sari, Colombes (FR)

(73) Assignee: SEQUANS COMMUNICATIONS S.A., Colombes (FR)

(*) Notice: Subject to any disclaimer, the term of this patent is extended or adjusted under 35 U.S.C. 154(b) by 45 days.

(21) Appl. No.: 16/175,226

(22) Filed: Oct. 30, 2018

(65) Prior Publication Data

US 2020/0137765 A1    Apr. 30, 2020

(51) Int. Cl.
*H04W 72/08* (2009.01)
*H04L 5/00* (2006.01)

(52) U.S. Cl.
CPC ......... *H04W 72/085* (2013.01); *H04L 5/0007* (2013.01); *H04W 72/082* (2013.01)

(58) Field of Classification Search
CPC .............. H04W 72/085; H04W 72/082; H04L 5/0007
See application file for complete search history.

(56) References Cited

U.S. PATENT DOCUMENTS

| 10,608,862 | B2 | 3/2020 | Sari | |
|---|---|---|---|---|
| 2009/0041092 | A1* | 2/2009 | Kim | H04L 5/0037 375/146 |
| 2011/0007784 | A1* | 1/2011 | Nakamura | H04B 7/2606 375/211 |
| 2015/0010104 | A1 | 1/2015 | Park et al. | |
| 2015/0043540 | A1* | 2/2015 | Nikopour | H04L 5/0007 370/335 |
| 2016/0100414 | A1* | 4/2016 | Guvenkaya | H04L 27/0008 370/329 |
| 2016/0366003 | A1* | 12/2016 | Kwon | H04L 1/007 |
| 2017/0230138 | A1* | 8/2017 | Xiong | H04W 72/0473 |
| 2017/0339713 | A1* | 11/2017 | Kimura | H04L 5/003 |
| 2018/0076993 | A1 | 3/2018 | Seo et al. | |
| 2018/0205503 | A1 | 7/2018 | Chen et al. | |
| 2019/0028238 | A1 | 1/2019 | Kimura et al. | |
| 2019/0306001 | A1 | 10/2019 | Sari et al. | |

OTHER PUBLICATIONS

Non-Final Office Action for U.S. Appl. No. 15/937,765, titled: NOMA Scheme, dated Jun. 18, 2019.
Sari, H., et al., "Multiple Access Using Two Sets of Orthogonal Signal Waveforms," IEEE Communications Letters vol. 4, Issue: 1, pp. 1-3 (2000).
Maatouk, A., et al., "Frequency-Domain NOMA with Two Sets of Orthogonal Signal Waverforms," IEEE Communications Letters, 22(5):906-909 (May 2018).
Notice of Allowance for U.S. Appl. No. 15/937,765, titled: NOMA Scheme, dated Jan. 16, 2020.

* cited by examiner

*Primary Examiner* — Kodzovi Acolatse
(74) *Attorney, Agent, or Firm* — Hamilton, Brook, Smith & Reynolds, P.C.

(57) ABSTRACT

A method of transmission for increasing communication channel capacity comprising superposing a first signal on a second signal to form a combined signal, wherein allocation of users of the communication channel to the first and second signals is based dynamically on channel conditions.

11 Claims, 4 Drawing Sheets

ENHANCED NOMA SCHEME

TECHNICAL FIELD

This disclosure relates to the increasing communication channel capacity of a NOMA scheme by way of dynamic signal combination based on channel conditions at a transmitter and de-combination at a receiver. It is particularly suited, but by no means limited, to a QPSK signal superposed onto a 16 QAM signal.

BACKGROUND

Non-Orthogonal Multiple Access (NOMA) is able, in principle, to achieve a higher throughput than orthogonal multiple access (OMA), which includes conventional multiple access schemes like time division multiple access (TDMA), Orthogonal code division multiple access (OCDMA), and Orthogonal frequency division multiple access (OFDMA). Recently, NOMA gained a significant interest in the technical community and in standardization for 5G cellular networks and beyond. Following the trend of 4G, the 3GPP has decided that multiple access for Enhanced Mobile Broadband (eMBB) and Ultra-Reliable Low-Latency Communications (URLLC) traffic in 5G will be based on OFDMA, but NOMA still stands as a strong candidate for Massive Machine-Type Communications (mMTC).

FIG. 1 illustrates an example of an uplink with conventional power-domain NOMA.

In this example, User 1 (11) has a signal (13) having higher power at the base station 10 than a signal (14) of User 2 (12). The base station (10) can detect the User 1 signal directly by sending the received signal to a threshold detector, but the same process does not apply for the User 2 signal, because the signal of this user is buried in the stronger User 1 signal. Once the User 1 signal is detected, the base station subtracts it from the received signal and sends the resulting signal to a threshold detector to detect the User 2 signal. This is successive interference cancellation (SIC). Clearly, a strong power imbalance is required between the two user signals, which is a basic requirement for power-domain NOMA. If the signal of User 1 is not substantially stronger than that of User 2, the User 2 signal will cause a significant SNR degradation in the detection of the User 1 signal, and the SIC receiver will fail to properly cancel the interference from User 1. This will lead to poor performance in the detection process of the User 2 signal. The bit error rate (BER) performance will be far from that achievable in the absence of interference.

The main issues with the above NOMA are that a) users with the same power at the base station (receiver) do not receive the same data rate and performance, and b) owing to the requirement of a power imbalance between users for detection purposes, the user with the higher power will have a much higher data rate and therefore each user does not receive the same quality of service.

Accordingly, there is a need to provide an enhanced NOMA scheme whereby communication channel capacity is increased while maintaining signal to noise, and energy performance.

SUMMARY

According to an aspect there is provided a method of transmission for increasing communication channel capacity as defined in claim 1. According to a second aspect there is provided a method of receiving a combined signal for increasing communication channel capacity as defined in claim 9. According to a third aspect there is provided a non-transitory computer readable medium comprising computer readable instructions that when executed by a processor, cause the processor to perform the method according to claim 1. According to a fourth aspect there is provided a non-transitory computer readable medium comprising computer readable instructions that when executed by a processor, cause the processor to perform the method according to claim 9.

Set out below are a series of clauses that disclose features of further aspects of the invention, which may be claimed. The clauses that refer to one or more preceding clause contain optional features.

1. A method of transmission for increasing communication channel capacity comprising:
   superposing a first signal on a second signal to form a combined signal, wherein allocation of users of the communication channel to the first and second signals is based dynamically on channel conditions.
2. The method of clause 1 wherein each symbol of the first signal interferes with all symbols of the second signal.
3. The method of clause 1 or 2 wherein the channel conditions comprise the received signal power from each user of the communication channel.
4. The method of any preceding clause wherein the allocation is dynamically updated when a new channel condition measurement is available.
5. The method of any preceding clause further including the allocation being dynamically updated per block, frame, sub-frame, or time slot of the second signal.
6. The method of any preceding clause wherein the channel measurements are provided by a base station.
7. The method of any preceding clause wherein the dynamic allocation is carried out at a base station.
8. The method of any preceding clause wherein the first signal and the second signal are orthogonal.
9. The method of any preceding clause wherein the first signal comprises MC-CDMA and the second signal comprises OFDMA.
10. The method of clause 9 wherein the OFDMA resources are allocated to the N users with the highest received signal power at the base station, and the MC-CDMA resources are allocated to the remaining M users.
11. A method of receiving a combined signal for increasing communication channel capacity comprising:
    performing threshold detection on the combined signal wherein the combined signal comprises a first signal superposed on a second signal wherein allocation of users of the communication channel to the first and second signals is based dynamically on channel conditions, and the threshold detection enables derivation of the first signal and the second signal.
12. The method of clause 11 wherein the thresholds of the threshold detection are based on the modulation schemes of the first signal and the second signal.
13. The method of clause 11 or 12 wherein the threshold detection comprises iterative threshold detection.
14. The method of any of clauses 11 to 13 wherein the threshold detector comprises a soft-decision threshold detector.
15. The method of any of clause 11 to 14 wherein threshold detection is carried out on each symbol of the second signal.
16. A non-transitory computer readable medium comprising computer readable instructions that when executed by a processor, cause the processor to perform the method according to clause 1.

17. A non-transitory computer readable medium comprising computer readable instructions that when executed by a processor, cause the processor to perform the method according to clause 11.

With all clauses, preferable and optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

DETAILED DESCRIPTION

The enhanced NOMA technique described herein is a channel overloading technique with improved performance. That is to say that the data rate and/or the number of users is increased with respect to known NOMA transmission by way of dynamically allocating a user to one of two orthogonal modulation schemes as channel conditions change.

Although the examples herein are discussed in relation to MC-CDMA superposed to OFDMA, however CDMA superposed to TDMA can equally apply. The disclosed method is applicable to any two orthogonal signal sets with different signal waveforms.

Figure 1:
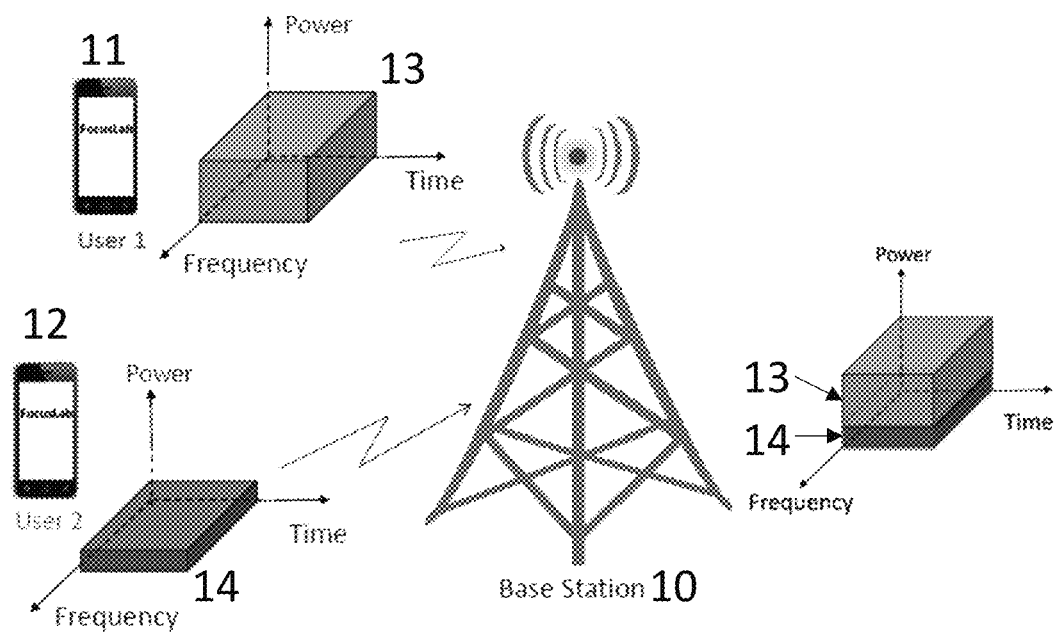
FIG. 1 illustrates a NOMA downlink.
Figure 2:
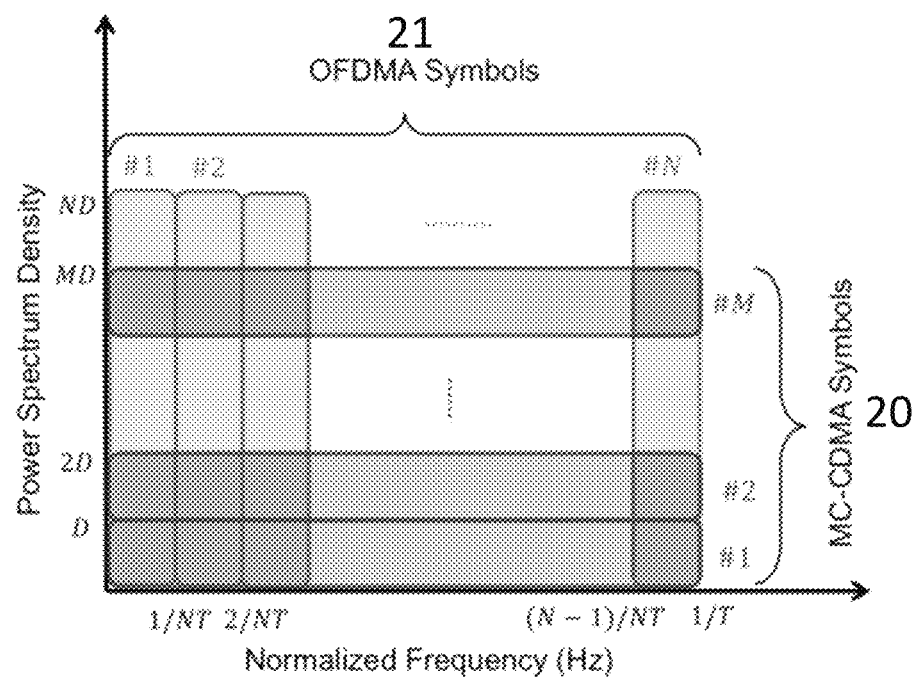
FIG. 2 illustrates superposed signals according to an example.

FIG. 2 illustrates a NOMA scheme, where two sets of signal waveforms, preferably orthogonal, are stacked (added) together to accommodate two groups of users. In this example, an OFDMA signal comprising OFDMA symbols 21 comprises N subcarriers with 1/NT subcarrier spacing. Each subcarrier may be assigned to a different user of the communication scheme, therefore the number of OFDMA users may be N.

An MC-CDMA signal 20 comprising MC-CDMA symbols is superposed to the OFDMA symbols 21 which are spread across the total bandwidth of 1/T using orthogonal Walsh-Hadamard (WH) sequences as would be understood.

The MC-CDMA signal set 20 is used only partially in order to make iterative detection usable. The MC-CDMA symbols 20 have a spectral density of D Watts/Hz, and since their bandwidth is 1/T Hz, the total power is D/T Watts.

Assuming that each of M MC-CDMA symbols is assigned to a separate user of the communication channel, there may be a total, K=N+M of active users using the communication channel.

In the AWGN case, all channel coefficients are equal to 1, and the S/I has a constant value equal to N/M. Focusing on any particular OFDMA symbol, it is seen that the interference power from each MC-CDMA symbol is 1/N, when the OFDMA symbol power is normalized by 1. With M interfering MC-CDMA symbols, the signal-to-interference ratio (S/I) is N/M, and provided that M is small compared to N (typically up to 25%) the OFDMA symbols can be detected quite reliably by a threshold detector.

Figure 3:
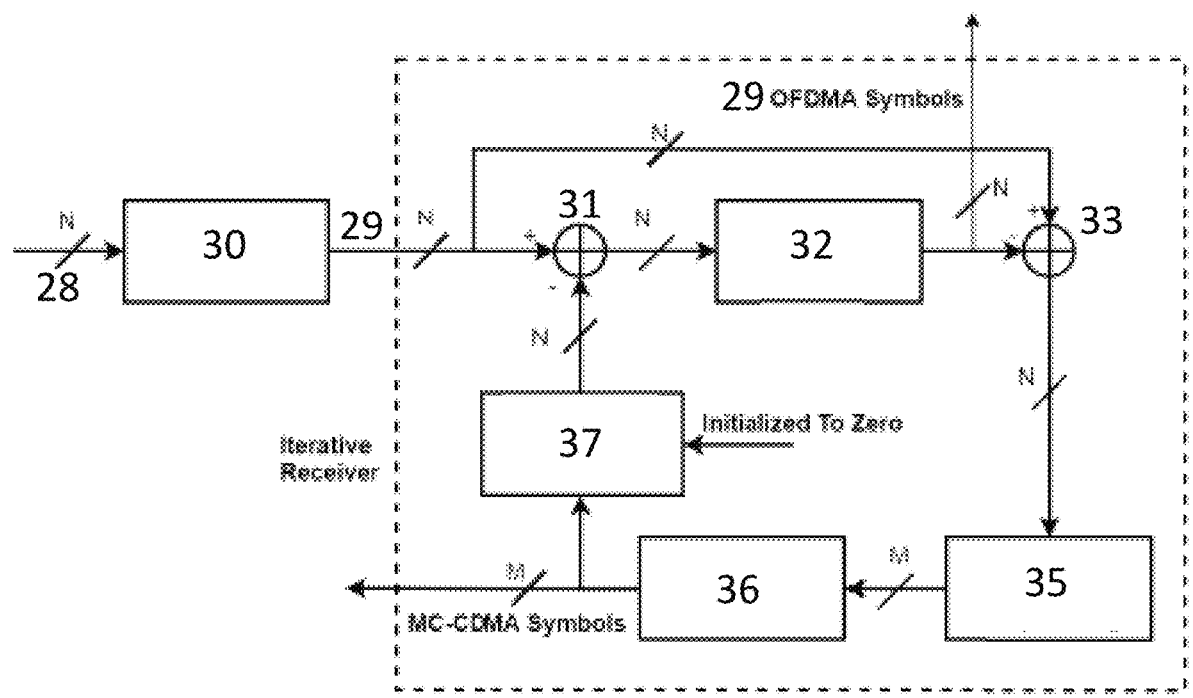
FIG. 3 illustrates an iterative detector according to an example.

FIG. 3 shows a suitable detector, an iterative detector. After cyclic prefix removal and serial to parallel conversion as would be understood, received signal 28 is passed through a discrete Fourier transform, DFT 30 and output 29 of the DFT feeds into a threshold detector 32. In the first iteration of the threshold detector, threshold detector 32 receives an unaltered received signal as can be seen as the subtractor 31 is initialised to zero. The detected OFDMA symbols from the output of threshold detector 32 are subtracted 33 from the received signal 29. After WH frequency de-spreading using locally available WH sequences 35 as would be understood, the resulting signal is sent to a threshold detector 36 to make decisions on the MC-CDMA symbols. Next, the detected MC-CDMA symbols are frequency-spread using the locally available WH sequences 37 as would be understood and their interference is subtracted 31 from the received signal 29 to make second-iteration decisions (at threshold detector 32) in relation to the received OFDMA symbols and at threshold detector 36 in relation to the superposed MC-CDMA symbols. The process may then continue to other iterations.

Threshold detectors 32 and 36 may be soft decision or hard decision detectors. A hard decision detector is typically implemented as a standard threshold detector. For example, for QPSK modulation, the threshold detector output is the sign function of its input. If we write the complex input as $x=x'+jx''$, where $x'$ is the real part of x, $x''$ is the imaginary part of x, and $j^2=-1$, then the output of the hard-decision detector is $\text{sign}(x')+j\cdot\text{sign}(x'')$.

A soft decision detector makes 'soft' decisions by introducing a shaping zone around the threshold level in the threshold detector. An example is:

$$\text{Soft}(x') = \begin{cases} +1, & \text{if } x' \geq \beta \\ x/\beta, & \text{if } -\beta \leq x' < \beta \\ -1, & \text{if } x' < -\beta \end{cases}$$

The same function applies to the imaginary part $x''$ of the complex input signal x. The shaping function in this example is linear. Other shaping functions can be used such as sinusoidal or other suitable function.

In this known NOMA scheme, N subcarriers are assigned to a predetermined set of N OFDMA users, and M spreading sequences to a predetermined set of M MC-CDMA users. The stacking is such that no interference arises between users of the same group (OFDMA or MC-CDMA respectively), but each user is subject to interference from all users of the other group.

As would be understood, depending on the number of users in the secondary set (M), two iterations may be sufficient, or 3 to 5 iterations may be required. 'Sufficient' is measured based on how many users we have in the secondary set. For example, if the Primary set is used in full and only a small subset of the secondary set is used, a relatively small number of iterations, for example two may be sufficient to detect all signals. If there are more users with resources from the secondary set, then more iterations might be needed in order to get close to ideal performance (ideal performance meaning the performance that would be obtained in the absence of interference). In the end, a 'sufficient' number of iterations is judged on performance of the interference cancellation.

As mentioned, the number of iterations required is a function of the M parameter (users M allocated an MC-CDMA symbol), which determines the channel overload factor, OF=M/N.

With the above scheme, the channel overload factor (the ratio of the number of MC-CDMA symbols to the number of OFDMA symbols) is limited to values approximating 20 or 25% in order to keep the BER performance close to the BER of the original OFDMA signal. This holds for AWGN channels and Rayleigh fading channels.

Turning back to the example of FIG. 2, using Rayleigh fading channels, which provide a good characterization of wireless communications networks. It is assumed that the communication channel response is not frequency-selective over the signal bandwidth (same attenuation by the channel for each signal), and a block fading model is used in which the channel is constant over a transmission frame period.

OFDMA and MC-CDMA resources are allocated to users in a static, pre-determined manner independently of the channel conditions. With a total number of K=N+M users transmitting over N (OFDMA) subcarriers, a first group of N users are assigned the OFDMA resources, and a second group of M are assigned MC-CDMA resources.

During a given frame period, the channel coefficients (conditions) associated to the K users ($U_1$, $U_2$, ..., $U_N$, $U_{N+1}$, ..., $U_{N+M}$) can be denoted ($h_1$, $h_2$, ..., $h_N$, $h_{N+1}$, ..., $h_{N+M}$). These coefficients follow a Rayleigh distribution and they are statistically independent of each other. On (OFDMA signal 21) subcarrier n (n=1, 2, ..., N), the signal received by the base station can be written as:

$$x_n = h_n \cdot a_n + \frac{1}{\sqrt{N}} \sum_{m=1}^{M} h_{N+m}(w_{m,n} b_m) + u_n$$

where $h_n \cdot a_n$ is the useful signal we want to detect. The sum term is the interference from the MC-CDMA signal 20, and the third term is noise.

Also, $a_n$ is the symbol transmitted by User n (n=1, 2, ..., N), $b_m$ is the symbol transmitted by User N+m (m=1, 2, ..., M), $w_{m,n}$ is the nth chip of the WH sequence associated to User N+m, and $u_n$ represents additive noise. The division by $\sqrt{N}$ in this equation is to conserve the symbol energy during symbol spreading as would be understood.

In the Rayleigh fading case, S/I has a random value determined by the fading coefficients during the considered frame. If for a given n (n=1, 2, ..., N), we have $$|h_n|^2 > \frac{1}{M} \sum_{m=1}^{M} |h_{N+m}|^2 \quad \text{[equation A]}$$

then the S/I value on subcarrier n will be higher than in the AWGN case and detection of OFDMA symbol $a_n$ will be more reliable. However, S/I will be smaller and detection less reliable in the opposite case, which is:

$$|h_n|^2 < \frac{1}{M} \sum_{m=1}^{M} |h_{N+m}|^2$$

It is noted that in the case of AWGN channels, all channel coefficients $h_n$, n=1, 2, ..., N are equal to 1, and equation A becomes a strict equality in this case. That is to say that the signal-to-interference ratio is
S/I=N/M in the AWGN case,
and $$S/I = M|h_n|^2 \Big/ \sum_{m=1}^{M} |h_{N+m}|^2 \quad \text{[equation B]}$$

in the Rayleigh fading case.

By dynamically allocating the signals for superposition, higher channel overloads may be achieved. Users of the communication channel are dynamically allocated either to OFDMA or MC-CDMA resources based on the measured channel conditions, i.e. the channel coefficient values.

When the channel condition measurements are updated (every transmission block, frame, sub-frame or time slot), the OFDMA resources (for example subcarriers) are dynamically allocated to the N users with the strongest (best) channel coefficients (higher received signal power at the base station), and the MC-CDMA resources (spreading sequences) are dynamically allocated to the remaining M users (with the weakest (worst) channel coefficients that is the lower received signal power at the base station).

With this dynamic user resource allocation and the superposition as described in relation to FIG. 2, the S/I value in equation B is higher than N/M because equation A is always true.

Further, when users are ordered in decreasing order of channel coefficients, i.e., $$|h_1|^2 \geq |h_2|^2 \geq |h_3|^2 \geq \ldots \geq |h_{N+M}|^2$$

It is clear that $$|h_n|^2 > \frac{1}{M} \sum_{m=1}^{M} |h_{N+m}|^2$$

for all n=1, 2, ..., N.

However, strict ordering of the channel coefficients is not needed. The separation of the users into two groups is all that is required: the first N users (OFDMA) with the strongest channel coefficients, and the second group of M users (MC-CDMA with the weakest coefficients. With these two groups, $$|h_n|^2 > \frac{1}{M} \sum_{m=1}^{M} |h_{N+m}|^2$$

for all n=1, 2, ..., N, because all terms in the sum are smaller than the term on the left hand side of the inequality.

Turning to the iterative detector of FIG. 3, with the N users of OFDMA having the strongest channel coefficients, the decisions of threshold detector 32 on OFDMA symbols during the first decoder iteration will be more reliable, and this will lead to lower SNR degradation of the iterative receiver as would be understood. In turn, this performance improvement can be exploited to increase the channel overload factor as will be shown.

In addition to increasing the channel overload factor, with dynamic user allocation, a given user is randomly allocated OFDMA or MC-CDMA resources depending on the overall distribution of the channel coefficients (the performance of the signal for that user on the communication channel). Assuming identical distribution for all users, each user will be allocated OFDMA resources with a probability of N/(N+M) and MC-CDMA resources with a probability of M/(N+M). Therefore, the average error probability (bit error rate, BER) will be the same for all users, and it is given by:

BER(User)=(N·BER(OFDMA)+M·BER(MC-CDMA))/(N+M)  [equation C]

During each OFDM symbol period, the iterative detector first makes decisions on OFDMA symbols, next it subtracts these symbols from the received signal to make decisions on MC-CDMA symbols, and continues with additional iterations as described previous as per FIG. 3 until the end of the transmission block (N OFDMA users and M MC-CDMA users). The iterative detector can be considered to be a block by block detector. Once the OFDMA and MC-CDMA BER values are estimated for a given SNR, the user BER can be computed according to equation C.

When the channel condition measurements are updated at or by the base station, the next block, frame, sub-frame or other time slot of transmission has a new dynamic allocation of users to the two signals (in this case N users of OFDMA and M users of MC-CDMA) as described above.

Although the examples herein are discussed in relation to OFDMA and MC-CDMA, TDMA and CDMA can equally apply. The disclosed method is applicable to any two orthogonal signal sets with different signal waveforms.

Figure 4:
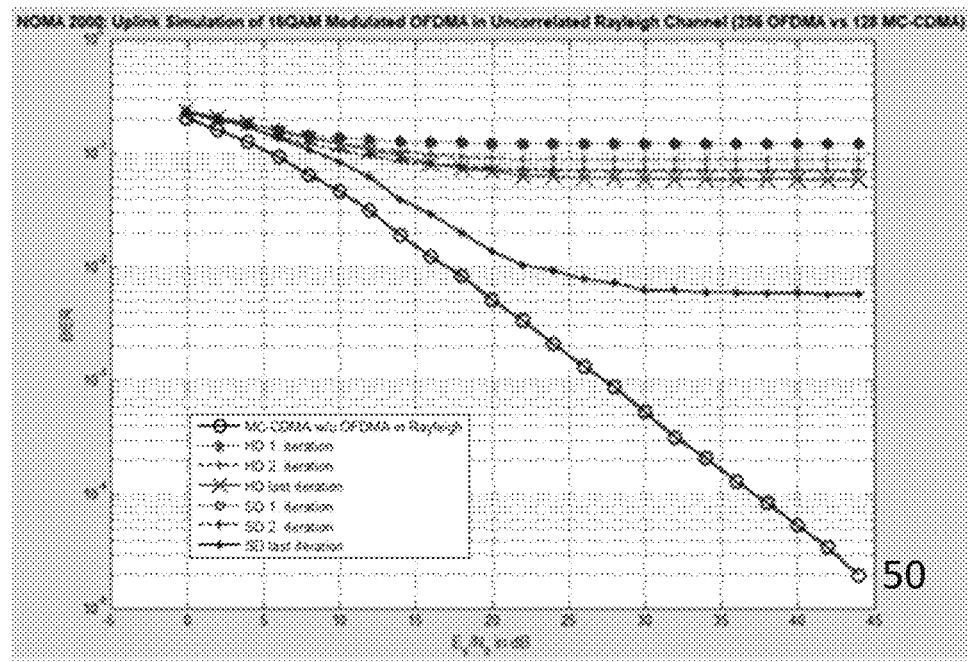
FIG. 4 illustrates a simulation of Rayleigh channels for OFDMA users of a pre-determined allocation NOMA scheme with 50% channel overload.
Figure 5:
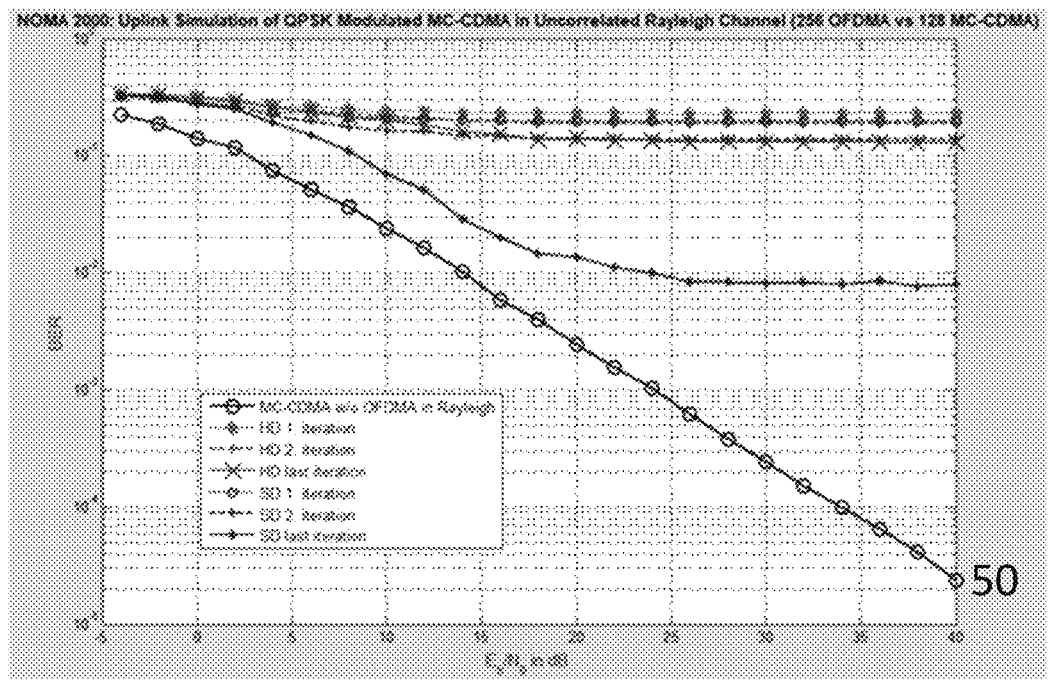
FIG. 5 illustrates a simulation of Rayleigh channels for MC-CDMA users of a pre-determined allocation NOMA scheme with 50% channel overload.

As a comparison with the new dynamic allocation method, FIG. 4 illustrates the performance of the signals of users allocated to 16 QAM OFDMA and FIG. 5 illustrates the performance of the signals of users allocated to QPSK MC-CDMA, both for a pre-determined allocation NOMA scheme. Both FIGS. 4 and 5 illustrate 50% channel overloading (M=128 MC-CDMA users to N=256 OFDMA users).

As can be seen, the ideal curve 50 comprising no interference is not matched by the pre-determined allocation of signals of FIGS. 4 and 5.

Figure 6:
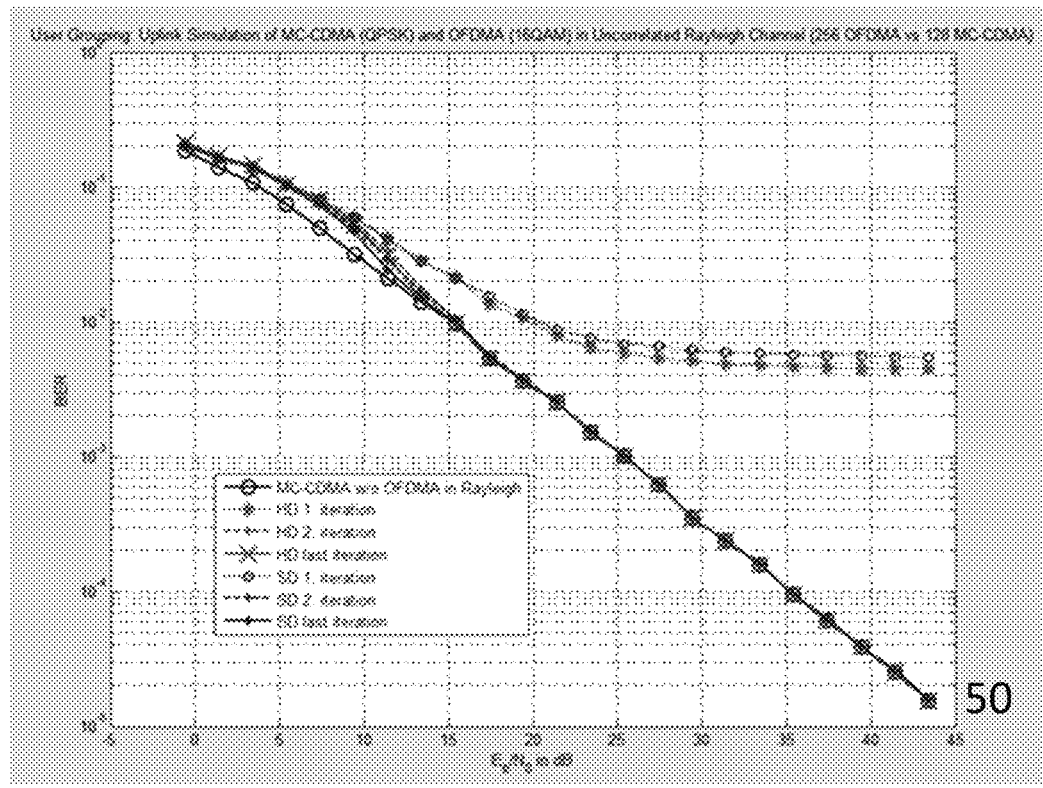
FIG. 6 illustrates a simulation of Rayleigh channels for all users of the disclosed new method with 50% channel overload (16 QAM employed for OFDMA and QPSK for MC-CDMA)
Figure 7:
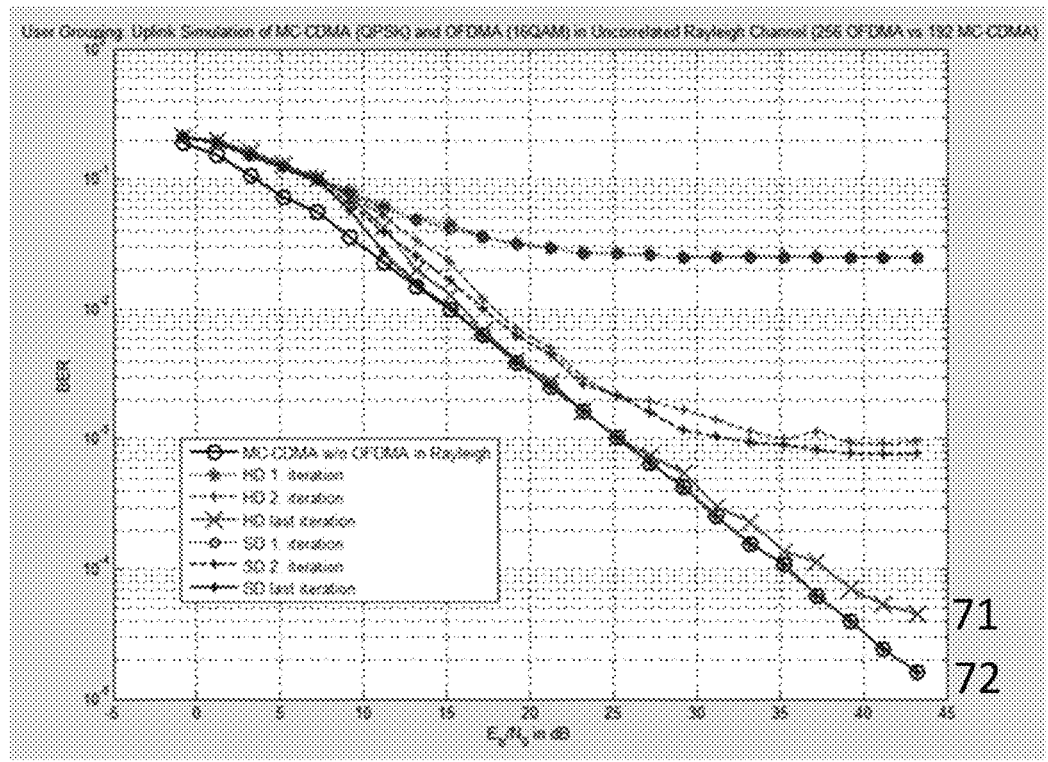
FIG. 7 illustrates a simulation of Rayleigh channels for all users of the disclosed new method with 75% channel overload (16 QAM employed for OFDMA and QPSK for MC-CDMA)
Figure 8:
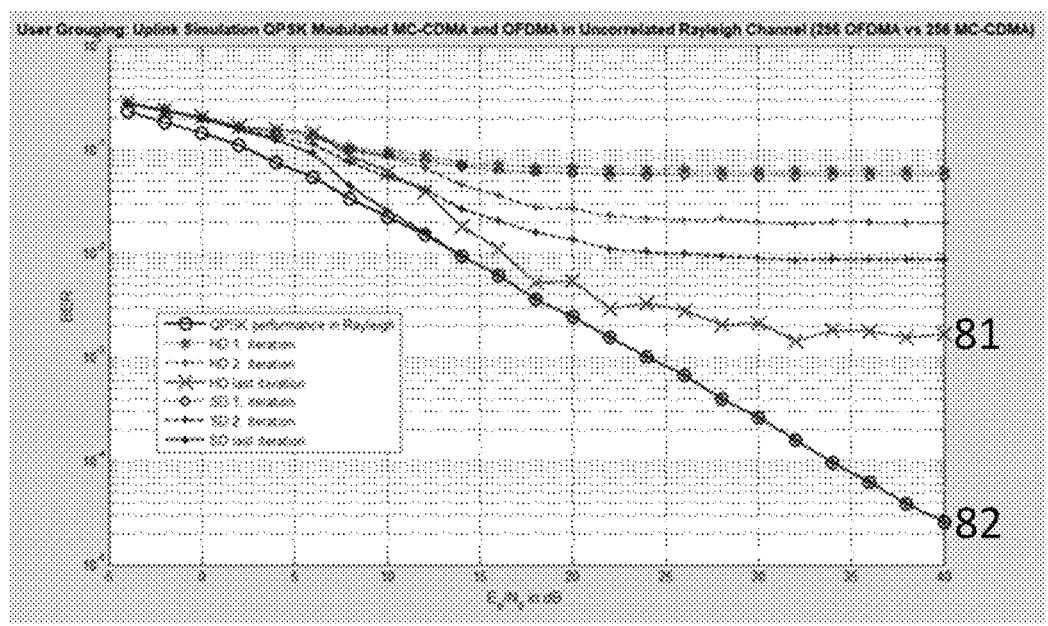
FIG. 8 illustrates a simulation of Rayleigh channels for all users of the disclosed new method with 100% channel overload (QPSK employed for both OFDMA and MC-CDMA).

FIGS. 6 to 8 illustrate simulations of Rayleigh channels with the disclosed new dynamic allocation method in operation.

FIG. 6 illustrates performance with 50% channel overloading (M=128, N=256, modulations used are 16 QAM for OFDMA users and QPSK for MC-CDMA users). Both a hard and a soft decision detector lead to ideal performance 50. This means that a 50% channel overload factor is achieved with the dynamic allocation method at essentially zero SNR degradation with both types of detectors FIG. 7 illustrates performance with 75% channel overloading (M=192, N=256, modulations used are 16 QAM for OFDMA users and QPSK for MC-CDMA users). The hard-decision detector 71 leads to some degradation, but the soft-decision detector 72 provides ideal performance.

FIG. 8 illustrates performance with 100% channel overloading (M=256, N=256, modulations used are QPSK for OFDMA users and MC-CDMA users). The hard-decision detector 81 leads to degradation, but the soft decision detector 82 provides ideal performance with no perceptible SNR degradation i.e. double capacity for no degradation.

The above figures show a large increase in user (uplink) capacity is obtainable.

The various methods described above may be implemented by a computer program product. The computer program product may include computer code arranged to instruct a computer or processor to perform the functions of one or more of the various methods described above. The computer program and/or the code for performing such methods may be provided to an apparatus, such as a computer or a processor, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer or processor may be configured in accordance with such code to perform one or more processes in accordance with the various methods discussed herein. Such an apparatus may take the form of a data processing system. Such a data processing system may be a distributed system. For example, such a data processing system may be distributed across a network.

The invention claimed is:

1. A method of transmission for increasing communication channel capacity comprising:
superposing a first signal on a second signal to form a combined signal, wherein allocation of users of the communication channel to the first and second signals is based dynamically on channel conditions, wherein the first signal comprises MC-CDMA and the second signal comprises OFDMA and wherein OFDMA resources are allocated to the N users with the highest received signal power at the base station, and MC-CDMA resources are allocated to the remaining M users.

2. The method of claim 1 wherein each symbol of the first signal interferes with all symbols of the second signal.

3. The method of claim 1 wherein the channel conditions comprise the received signal power from each user of the communication channel.

4. The method of claim 1 wherein the allocation is dynamically updated when a new channel condition measurement is available.

5. The method of claim 4 further including the allocation being dynamically updated per block, frame, sub-frame, or time slot of the second signal.

6. The method of claim 1 wherein the channel measurements are provided by a base station.

7. The method of claim 1 wherein the dynamic allocation is carried out at a base station.

8. The method of claim 1 wherein the first signal and the second signal are orthogonal.

9. A non-transitory computer readable medium comprising computer readable instructions that when executed by a processor, cause the processor to perform the method according to claim 1.

10. A method of receiving a combined signal for increasing communication channel capacity comprising:
   performing detection on the combined signal wherein the combined signal comprises a first signal superposed on a second signal wherein allocation of users of the communication channel to the first and second signals is based dynamically on channel conditions, and the detection enables derivation of the first signal and the second signal, wherein the first signal comprises MC-CDMA and the second signal comprises OFDMA and wherein OFDMA resources are allocated to the N users with the highest received signal power at the base station, and MC-CDMA resources are allocated to the remaining M users.

11. A non-transitory computer readable medium comprising computer readable instructions that when executed by a processor, cause the processor to perform the method according to claim 10.

\* \* \* \* \*